United States Patent [19]

Akema

[11] Patent Number: 4,776,598
[45] Date of Patent: Oct. 11, 1988

[54] MECHANICAL FACE SEAL FOR A ROTATING SHAFT OF A FLUID PUMP

[75] Inventor: Teruo Akema, Saitama, Japan

[73] Assignee: Honda Giken Kogyo Kabushiki Kaisha, Tokyo, Japan

[21] Appl. No.: 887,267

[22] Filed: Jul. 21, 1986

[30] Foreign Application Priority Data

Jul. 31, 1985 [JP] Japan .................................. 60-167471

[51] Int. Cl.⁴ ............................................... F16J 15/36
[52] U.S. Cl. ........................................ 277/88; 277/87; 277/96.1; 277/96.2
[58] Field of Search ........................ 277/86, 87, 88, 89, 277/93 R, 93 SD, 96, 96.1, 96.2, 81 R

[56] References Cited

U.S. PATENT DOCUMENTS

| | | | |
|---|---|---|---|
| 2,420,718 | 5/1947 | Odelius | 277/86 |
| 2,556,133 | 6/1951 | Bright | 277/89 X |
| 2,601,996 | 7/1952 | Sefren | 277/88 X |
| 2,647,773 | 8/1953 | Berner | 277/87 |
| 2,729,475 | 1/1956 | Chambers et al. | 277/88 X |
| 2,994,547 | 8/1961 | Dolhun et al. | 277/89 |
| 3,001,807 | 9/1961 | Amirault et al. | 277/89 |
| 3,782,735 | 1/1974 | Novosad | 277/88 X |
| 3,822,066 | 7/1974 | Keys | 277/88 X |
| 4,415,167 | 11/1983 | Gits | 277/88 |
| 4,451,049 | 5/1984 | Charhut | 277/88 X |

FOREIGN PATENT DOCUMENTS

| | | | |
|---|---|---|---|
| 2703104 | 7/1978 | Fed. Rep. of Germany | 277/88 |
| 564714 | 10/1944 | United Kingdom | 277/86 |
| 965839 | 8/1964 | United Kingdom | 277/87 |
| 1325940 | 8/1973 | United Kingdom | 277/89 |
| 14222523 | 1/1976 | United Kingdom | 277/81 R |

Primary Examiner—Robert S. Ward
Attorney, Agent, or Firm—Lyon & Lyon

[57] ABSTRACT

A mechanical seal for a fluid pump wherein a driven ring is mounted in the pump casing and a seat ring is mounted on the pump vane. The two rings have opposed, radial faces for effecting the mechanical seal. The face on the seat ring is of a smaller width in the radial direction than the face of the driven ring so that any axial misalignment of the driven ring relative to the vane shaft does not effect the area of engagement on the two faces that form the seal, that is, the annular engagement area on the driven ring remains constant and coextensive with the engaging face of the seat ring.

11 Claims, 1 Drawing Sheet

MECHANICAL FACE SEAL FOR A ROTATING SHAFT OF A FLUID PUMP

This invention relates to a mechanical seal for use in a fluid pump and, more specifically, to such a seal for an automotive water pump in which the intrusion or leakage of fluid to the rotating shaft is reduced as much as possible.

A mechanical seal in a fluid pump is comprised of a seat ring attached to the rotating shaft carrying the pump vane thereon and a driven ring attached to the pump casing as the principle components and the opposing faces of those components that are perpendicular to the rotating shaft are urged into engagement with each other by a spring or other resilient member whereby leakage rarely occurs where the respective members are fabricated with a high degree of accuracy and mounted accurately.

However, in practice it is actually very difficult to exactly align the driven ring relative to the rotating shaft and, accordingly, the rotating contact face between the driven ring and the seat ring varies during each revolution by reason of the axial misalignment. As a result, the engaging surface of the seat ring is deposited with fluid at portions that come in contact with the abutting face of the driven ring and leak through to the space adjacent the rotating shaft. This leakage defeats the purpose of the mechanical seal and if the fluid is water then the gradual intrusion into the space will ultimately result is damaging corrosion of the rotating shaft. This problem in prevalent with water pumps for water-cooled internal combustion engines, such as used in automobiles. One example of a prior art water pump seal having this problem is shown in U.S. Pat. No. 2,598,886.

FIG. 1 is the front elevation and side sectional view schematically showing the contact relationship in a typical prior art seal between the driven ring (normally made of sintered carbon) 01 mounted on the pump casing in an eccentric mode, due to inaccuracies, relative to the rotating shaft L (shown only by the axial line) and a seat ring (normally made of ceramics) 02 mounted in exact alignment with the shaft L. When the seat ring 02 rotates from the illustrated state, the surface portion 03 of the seat ring 02 within the hatched area in the figure also comes in contact with the abutting face of the driven ring 01 and, correspondingly, the wetted surface of the seat ring 02 tends to carry the fluid under the abutting surface of the driven ring 01 to cause leakage.

An object of the present invention is to provide a mechanical seal for use in a fluid pump wherein the intrusion of water toward the rotating shaft is reduced as much as possible.

The foregoing object is attained in this mechanical seal for use in a fluid pump by a structure wherein the seat ring attached to the rotating shaft and the driven ring attached to the pump casing are abutted against each other at faces perpendicular to the rotating shaft, and wherein the seat ring is made of sintered carbon or resin while the driven ring is made of ceramics, and the area of abutting face of the seat ring is smaller than that of the driven ring whereby any misalignment axially has no adverse effect.

A further explanation of the invention will be made hereinafter by referring to a preferred embodiment of this invention shown in FIGS. 2 and 3 of the drawings, wherein.

Figure 2:
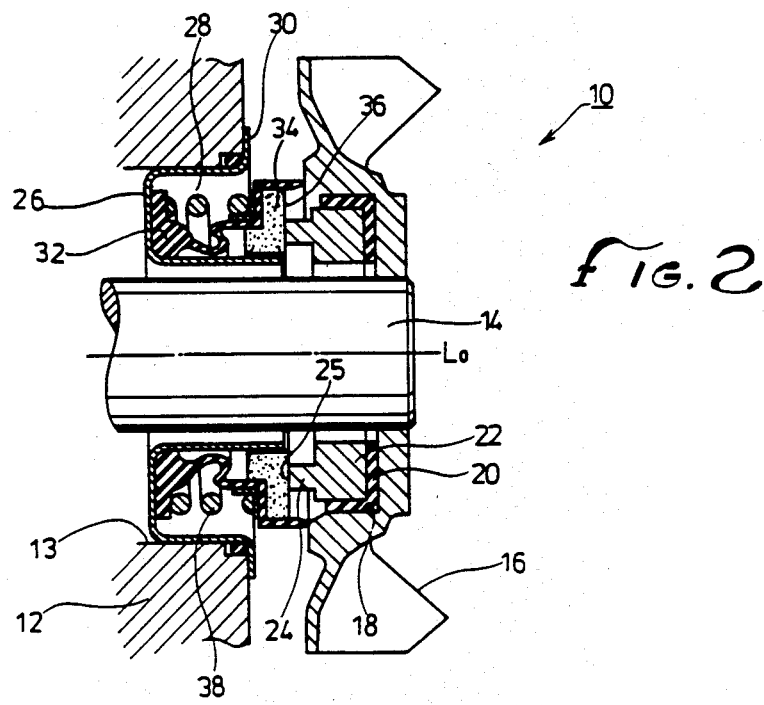
FIG. 2 is sectional side view of the complete mechanical seal of this invention.

Referring now in detail to FIG. 2, a cross sectional view is shown of a portion of a hydraulic pump 10 for use in automobiles. In the hydraulic pump 10, a rotating shaft 14 integrally carrying a vane 16 thereon is rotatably supported in a pump casing 12 by bearing means (not shown). A seat ring 22 made of sintered carbon or resin is fitted tightly to a circular recess 18 formed at the base portion of the vane 16 by way of a buffer rubber 20 of an L-shaped cross section.

A support cylinder 26 made of stainless steel is fitted tightly into the bore 13 of the pump casing 12 with a flange 30 thereon being engaged at the peripheral end of the bore 13. An O-ring seal 15 is fitted between the cylinder 26 and pump casing 12 to seal those two components against leakage through the bore 13. A sealing rubber 32 is fitted tightly to the inside of the circular recess 28 of the support cylinder 26. The free end of the sealing rubber 32 is formed as a cup with a thin cylindrical wall and a driven ring 34 made of ceramics and of a substantially L-shaped cross section is fitted into that cup. A compression coil spring 38 is externally fitted over the sealing rubber 32 while being situated in a groove-like recess formed at the outer circumference of the seal rubber 32 and resiliently biases the driven ring 34 from the back thereof through the layer of the seal rubber 32. This causes the engaging or opposing face 36 of the driven ring 34 to be urged into engagement with the opposing face 25 of the seat ring 22 that is, the end face 25 of a narrow protruding ring 24 that extends axially from the seat ring 22. The area of the opposing face 25 is substantially smaller than the opposing face 36 and, therefore, the annular-shaped area of contact between the seat ring 22 and the driven ring 34 is maintained constant during rotation of the vane 16 so that a large contact pressure can be maintained for preventing the intrusion of water toward the rotating shaft 14.

Figure 1:
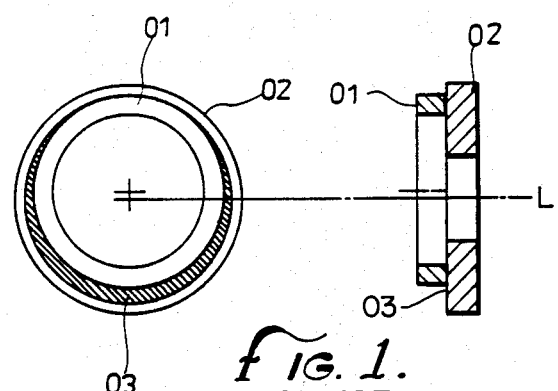
FIG. 1 is a schematic front elevation view (on the left) and a sectional side view of a prior art seat ring and driven ring of a mechanical seal.
Figure 3:
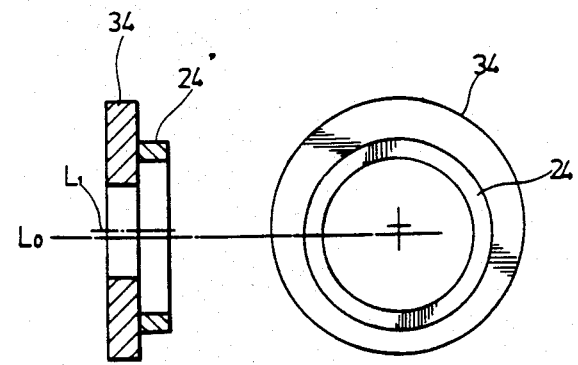
FIG. 3 is a schematic front elevation (on the right) and sectional side view of the two rings of this invention.

Although this embodiment is constructed as described above with the seat ring 22 formed with a high degree of accuracy and fitted to the base portion of the vane 16, it is difficult to accurately align the driven ring 34 axially since it is held by the sealing rubber 32 and resiliently biased by the compression coil spring 38 relative to the rotating shaft 14. It is highly possible, as shown in FIG. 3, that the axial center $L_1$. For the driven ring 34 is deviated greatly from the axial center $L_0$, for the rotating shaft 14. However, since the seat ring 22 is formed into an exact circle at a high degree accuracy and aligned accurately relative to the axial line $L_0$, and since the area of the opposing face 36 at the driven ring 34 is sufficiently larger as compared with the area of the opposing face 25 of the protruded ring 24, no radial displacement results in the contact relationship between the opposing face 25 and the opposing face 36, by which an effective water seal is attained between the opposing faces 36 and 25. This is in contrast to the prior art, as schematically shown in FIG. 1, wherein the seat ring 02 sealing surface "orbits" relative to the smaller sealing surface of the driven ring 01.

As is apparent from the foregoing descriptions, in the mechanical seal for use in a fluid pump according to this invention, since the seat ring is made of sintered carbon or resin, while the driven ring is made of ceramics and the area of the seat ring is made smaller than that of the driven ring with respect to each of the opposing faces, the area of contact between the two rings remains constant and doesn't fluctuate radially during rotation of the pump, so long as the seat ring is formed at a high accuracy and accurately aligned with the shaft and, accordingly, any possible leaks toward the rotating shaft are greatly reduced.

I claim:

1. A mechanical seal for a fluid pump having a casing and a rotating shaft, comprising, a seat ring substantially axially aligned with and mounted for rotation with the shaft, a support cylinder fitted into a bore in the casing generally in axial alignment with the shaft, a sealing rubber fitted within said support cylinder, with the free end of said sealing rubber forming a cup, a driven ring fitted into said cup, means urging the driven ring into engagement with the seat ring, said seat ring and driven ring having opposing surfaces substantially perpendicular to the shaft for sealing engagement with each other, and said opposing surface on said seat ring being of a radial dimension smaller than said opposing surface on said driven ring.

2. The mechanical seal of claim 1 wherein said seat ring is of a sintered carbon material.

3. The mechanical seal of claim 2 wherein said driven ring is of a ceramic material.

4. The mechanical seal of claim 3 wherein said seat ring has a body portion and a protruding ring of smaller radial dimension than said body portion, and said opposing surface on said seat ring is formed on said protruding ring.

5. The mechanical seal of claim 1 wherein a coil compression spring comprises means for urging the driven ring into engagement with the seat ring.

6. In a mechanical seal for a fluid pump having a casing and a shaft with a vane rotatably mounted in the casing, the improvement comprising, a driven ring for mounting in the casing, a seat ring for mounting on the vane for rotation therewith, said driven ring and seat ring having radially extending opposed faces for engagement with each other, and said opposed face on said seat ring being smaller than said opposed face on said driven ring for minimizing radial variations in an area of engagement between said opposing faces.

7. The mechanical seal of claim 6 wherein said sealing rubber makes contact with the base portion of said vane.

8. The mechanical seal of claim 6 wherein said seat ring is fitted within a circular recess formed at the base portion of vane.

9. The mechanical seal of claim 6 wherein said seat ring is fitted tightly within a circular recess of said vane by a buffer rubber of an L-shaped cross section.

10. The mechanical seal of claim 1 wherein said support cylinder is of stainless steel with radius corners.

11. The mechanical seal of claim 1 further comprising an O-ring seal fitted between said support cylinder and said casing for forming a seal against fluid leakage through said bore.

* * * * *